United States Patent [19]

Trell

[11] Patent Number: 4,872,194

[45] Date of Patent: Oct. 3, 1989

[54] METHOD FOR TRANSMISSION OF ALARM SIGNALS UTILIZING AN ENTRANCE TELEPHONE SYSTEM

[76] Inventor: Anders E. Trell, Polhemsgatan 20 B, Stockholm, Sweden, S-112 36

[21] Appl. No.: 220,400

[22] Filed: Jul. 18, 1988

Related U.S. Application Data

[63] Continuation of Ser. No. 5,281, Jan. 16, 1987, abandoned, which is a continuation of Ser. No. 726,896, filed as PCT SE83/00296 on Aug. 23, 1983, published as WO85/01169 on Mar. 14, 1985, abandoned.

[51] Int. Cl.$^4$ ............................................. H04M 11/04
[52] U.S. Cl. ........................................ 379/40; 379/103
[58] Field of Search ............................... 379/40, 42–44, 379/51, 103

[56] References Cited

U.S. PATENT DOCUMENTS

| | | | |
|---|---|---|---|
| 3,917,911 | 11/1975 | Lesher | 379/103 |
| 3,947,641 | 3/1976 | Trell | 379/103 |
| 3,978,479 | 8/1976 | Schmitz | 379/42 X |
| 4,097,690 | 6/1978 | Kuntz et al. | |
| 4,097,696 | 6/1978 | Nyhuis et al. | |
| 4,113,986 | 9/1978 | Clement et al. | 379/103 |
| 4,137,429 | 1/1979 | Stockdale | |
| 4,375,637 | 3/1983 | Desjardins | |
| 4,436,958 | 3/1984 | Hansen et al. | 379/103 |
| 4,503,288 | 3/1985 | Kessler | 379/51 X |
| 4,521,645 | 6/1985 | Carroll | |
| 4,578,540 | 3/1986 | Borg et al. | 379/40 |

FOREIGN PATENT DOCUMENTS 2015850  9/1979  United Kingdom ................ 379/104

*Primary Examiner*—Keith E. George
*Attorney, Agent, or Firm*—Fleit, Jacobson, Cohn, Price, Holman & Stern

[57] ABSTRACT

A method and apparatus for transmission of alarm signals by utilization of an entrance telephone set system connected to a public telephone network, of the type including a selectively addressable telephone number dialing device, preferably of the type disclosed in U.S. Pat. No. 3,947,641, the telephone number dialing device being connected to one or a number of manually or automatically operable alarm indicators, which when operated initiate dialing of predetermined telephone numbers.

4 Claims, 1 Drawing Sheet

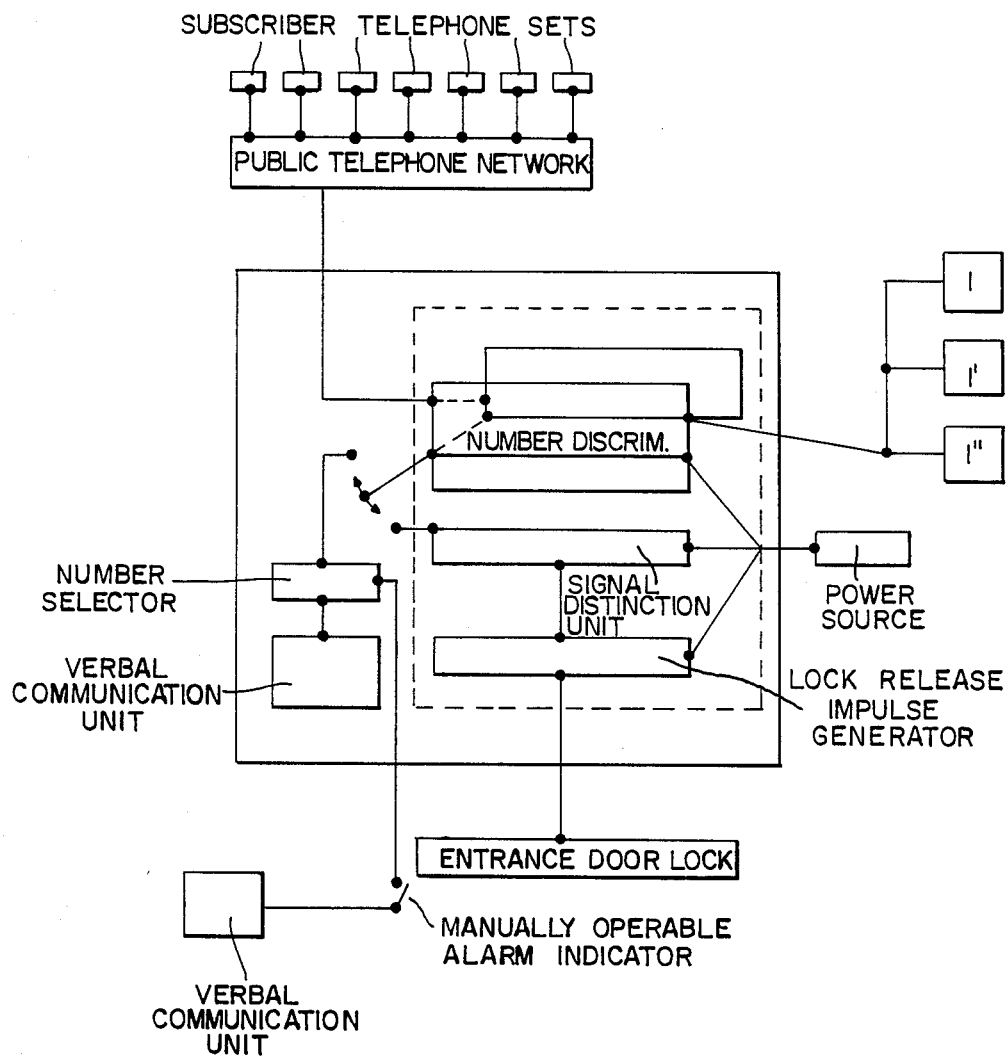

METHOD FOR TRANSMISSION OF ALARM SIGNALS UTILIZING AN ENTRANCE TELEPHONE SYSTEM

This is a continuation of application Ser. No. 005,281, filed Jan. 16, 1987 now abandoned which in turn is a continuation of Ser. No. 726,896 filed as PCT SE83/00296 on Aug. 23, 1983, published as WO85/01169 on Mar. 14, 1985, now abandoned.

CROSS REFERENCE TO RELATED APPLICATION(S)

This U.S. application stems from PCT International Application No. PCT/SE83/00296 filed Aug. 23, 1983.

BACKGROUND OF THE INVENTION

The present invention relates to a method and apparatus for transmission of alarm signals, and is based on utilization of an entrance telephone set system connected to a public automatic subscriber telephone network of the type disclosed in U.S. Pat. No. 3,947,641, or any other similar type of system, e.g. as disclosed in U.S. Pat. Nos. 3,917,911 or 4,113,986.

It is previously known to utilize a public subscriber telephone network for transmission of various types of alarm signals, either utilizing continuously switched-through connections, or utilizing mechanically or electronically operated automatic dialling equipment, during alarm condition arranged to facilitate connection via a telephone line to a predetermined subscriber telephone number, e.g. an alarm surveillance centre.

U.S. Pat. No. 3,947,641 discloses how a public telephone network can be used for entrance signalling and door opening purposes. By means of a telephone line from a building, specific entrance calls are switched via the public telephone network to tenants within the building. This is made possible by the use of a device, referred to as "the Number Discriminator", restricting the use to preprogrammed, but otherwize conventional telephone numbers. A common "automatic dialler", which can only dial one or a number of certain preprogrammed telephone numbers, acts as such a discriminator, since calls can only be made to parties dialled by the automatic dialler. However, this is only true, provided that no other conventional methods for dialling are offered to the calling party. A device as indicated above could be denominated as an "active" number discriminator, which by design and programming has been preset with regard to which telephone number to be dialled, based on the way in which the device is addressed. The telephone number dialler is thus only accessable for a visitor by means of a conventional name-/signalling panel. When the signalling key for a certain tenant is depressed, or by short number or telephone subscriber number selection from a key set, an "entrance call" is initiated.

SUMMARY OF THE PRESENT INVENTION

The object of the present invention is to disclose how an installation of the above described type also can be utilized for an additional purpose, i.e. transmission of various types of alarm signals, while maintaining previously intended functions.

The previously mentioned number dialler can also be addressed from other locations, and thereby cause connection of other categories of calls. This feature is used according to the present invention in conjunction with an entrance telephone set installation of the type disclosed in the aforementioned U.S. Pat. No. 3,947,641 for accomplishing transmission of various types of alarm signals.

The method according to the present invention is thus based on the existence of an entrance telephone set installation of above stated type, connected to a public telephone subscriber network and including a selectively addressable telephone number dialling device, and is mainly characterised in that said telephone number dialling device is connected to one or a number of manually or automatically operable alarm indicators, which when operated initiate dialling of predetermined telephone numbers.

BRIEF DESCRIPTION OF THE DRAWING

A basic embodiment of an installation of the above described type will now be more fully described with reference to the accompanying drawing, which shows schematically apparatus for transmission of alarm signals.

DETAILED DESCRIPTION OF THE INVENTION

Said drawing shows a scehmatical block diagram, which basically corresponds to the block diagram forming a part of previously mentioned U.S. patent. Since included parts are substantially previously known and described in said publication, such previously known parts will not be discussed. However, the block diagram also shows a number of alarm indicators, denominated 1, 1', and 1''. Said alarm indicators are connected to the number discriminator, either directly, or via incoming signal indicating means. The alarm indicators are advantageously arranged having priority, thereby, during alarm conditions, interrupting existing connections, or attempts to establish connection, between the entrance telephone set and subscribers connected to the installation.

As an example, a manually operable alarm indicator could for instance comprise of a pushbutton marked "EMERGENCY" and associated unit for verbal communication. This would offer the possibility of making an emergency call to an emergency alarm centre, if, and where, such a pushbutton should be available, would be a policy question.

A technically and economically more important advantage is related to a different field of use. Most buildings requiring an entrance telephone installation, normally also require alarm installations. By reductions made in the number of employees, such as caretakers, more buildings are now made "unmanned". Lift alarm systems, boiler fault alarm, fire and burglary alarm systems, constitute examples of alarms which require attention, and alarm installations transmitting various types of alarms via the public telephone network to certain recipients, e.g. alarm surveillance centres and security companies, are coming more and more into demand. Presently used types of such installatons require access to an outgoing telephone line connected to a telephone exchange, and also some type of automatic dialling equipment, which automatically dials the intended subscriber telephone number, based on which sensing device that has been activated to address same.

A building having an entrance telephone set installation of the type disclosed in the aforementioned U.S. Pat. No. 3,947,641 has access to an outgoing telephone line and an automatic telephone number dialling device. By a small addition to such an installation, basically only to the cost of discussed various types of sensing devices, such a building receives the ability to transmit alarm signals via the public telephone network. The number of various alarm types can be decided on basis of actual demand, and also on basis of type/location/number of different sensing devices, which are arranged to address the number discriminator to dial and make specific calls/alarms for each sensing device that is influenced.

Certain types of alarms are more suitable than other. As a rule, alarms common for a building, such as for example lift, boiler, burglary and fire alarms, are preferably sent via the outgoing telephone line common for the building, whereas more specific alarms for each tenant, such as e.g. flat burglary alarms, old age people and safety surveillance alarms and similar, are as previously more suited to be transmitted via the various tenants private telephone lines.

A major advantage is, that lift alarms via the public telephone network makes it possible to establish verbal contact with persons trapped in a lift, and thus possibility to give such persons reassuring information.

I claim:

1. A method for transmission of alarm signals via a public subscriber telephone network to a central office from an entrance telephone set installation, comprising the steps of:

providing an entrance telephone installation including an entrance telephone set connectable to a public subscriber telephone network;

providing said entrance telephone installation with a selectively addressable telephone number dialling device for discriminating selected addresses input thereto from said entrance telephone set and for connecting with said public subscriber telephone network and dialling selected pre-programmed telephone numbers in accordance with said discriminated addresses; and providing at least one alarm indicator connected to said selectively addressable telephone number dialling device which alarm indicator when actuated by an alarm condition causes said selectively addressable telephone number dialling device to connect with the public subscriber telephone network and to initiate dialling of at least one predetermined telephone number for transmitting an alarm signal via the public subscriber telephone network from said selectively addressable telephone number dialling device when said alarm indicator is actuated.

2. A method for transmission of alarm signals according to claim 1, wherein upon actuation of said at least one alarm indicator said selectively addressable telephone number dialing device gives priority to dialing of said predetermined telephone number and subsequent connection therewith over dialing of and connection with telephone numbers corresponding to addresses selected at the entrance telephone set.

3. A method for transmission of alarm signals according to claim 1, further comprising providing a verbal communication unit and a manually operable alarm indicator connected with the selectively addressable telephone number dialling device for permitting verbal communication with a predetermined subscriber telephone on the public subscriber telephone network when the manual alarm indicator is operated.

4. An apparatus for transmission of alarm signals via a public subscriber telephone network from an entrance telephone installation-provided premises to a central office connected with the public subscriber telephone network, comprising;

an entrance telephone installation connectable to the public subscriber telephone network and having an entrance telephone set;

a selectively addressable telephone number dialling device operably connected with said entrance telephone installation for discriminating selected addresses input thereto from said entrance telephone set and for connecting with said public subscriber telephone network and dialling selected preprogrammed telephone numbers in accordance with said discriminated addresses; and at least one alarm indicator operably connected to said selectively addressable telephone number dialling device which at least one alarm indicator, upon being actuated by an alarm condition, causes said selectively addressable telephone number dialling device to connect said entrance telephone installation with the public subscriber telephone network and to initiate dialling of at least one predetermined telephone number for transmitting an alarm signal via the public subscriber telephone network from said selectively addressable telephone number dialling device when said alarm indicator is actuated.

* * * * *